United States Patent
Heiden

(10) Patent No.: US 7,974,928 B2
(45) Date of Patent: Jul. 5, 2011

(54) SYSTEM AND METHOD FOR SECURING DATABASE RECORDS FROM TAMPERING AND MANAGING AND RECOVERING FROM COMPONENT FAILURE IN DEVICES SUCH AS POSTAGE VALUE DISPENSING SYSTEMS

(75) Inventor: Richard W. Heiden, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 2324 days.

(21) Appl. No.: 10/890,081

(22) Filed: Jul. 13, 2004

(65) Prior Publication Data

US 2006/0015500 A1    Jan. 19, 2006

(51) Int. Cl.
*G06Q 20/00* (2006.01)

(52) U.S. Cl. ............... 705/64; 705/60; 380/51; 380/55

(58) Field of Classification Search .......... 705/50, 705/60, 62, 64, 80, 401; 707/1, 9
See application file for complete search history.

(56) References Cited

U.S. PATENT DOCUMENTS

| | | | | |
|---|---|---|---|---|
| 5,008,936 A * | 4/1991 | Hamilton et al. | ............ | 380/281 |
| 5,016,277 A * | 5/1991 | Hamilton | ............ | 713/150 |
| 5,022,076 A * | 6/1991 | Rosenow et al. | ............ | 380/2 |
| 5,265,164 A * | 11/1993 | Matyas et al. | ............ | 380/30 |
| 5,931,947 A * | 8/1999 | Burns et al. | ............ | 726/4 |
| 6,466,921 B1 | 10/2002 | Cordery et al. | | |
| 6,918,117 B2 * | 7/2005 | Mayfield | ............ | 718/105 |
| 7,216,110 B1 * | 5/2007 | Ogg et al. | ............ | 705/80 |
| 7,236,956 B1 * | 6/2007 | Ogg et al. | ............ | 705/50 |
| 2002/0161742 A1 * | 10/2002 | Heiden et al. | ............ | 707/1 |

* cited by examiner

*Primary Examiner* — Calvin L Hewitt, II
*Assistant Examiner* — Mohammad A Nilforoush
(74) *Attorney, Agent, or Firm* — Brian A. Lemm; Charles R. Malandra, Jr.

(57) ABSTRACT

A method of managing and recovering from the failure of cryptographic devices in a secure transaction processing system including a database, a plurality first cryptographic devices and a standby cryptographic device. Each of the first cryptographic devices periodically generates and sends to the database a total freshness counter record and generates and sends to another of the first cryptographic devices a digital signature and time stamp record. Upon failure of a first cryptographic device, the standby cryptographic device requests and receives the current total freshness counter record and digital signature and time stamp record for the failed first cryptographic device, and uses the digital signature and time stamp record to verify that the total freshness center record is most current. If so verified, the standby cryptographic device assumes the operation of the failed first cryptographic device.

18 Claims, 5 Drawing Sheets

US 7,974,928 B2

SYSTEM AND METHOD FOR SECURING DATABASE RECORDS FROM TAMPERING AND MANAGING AND RECOVERING FROM COMPONENT FAILURE IN DEVICES SUCH AS POSTAGE VALUE DISPENSING SYSTEMS

FIELD OF THE INVENTION

The present invention relates to secure management of information contained in a database and more particularly to a system and method for securely storing and changing database records and managing and recovering from system component failure.

BACKGROUND OF THE INVENTION

The use of the Internet as a vehicle for communicating information and exchanging value electronically has resulted in the need for ensuring that such transactions take place in a secure manner. Not only is it imperative that the communication itself be secure, but just as important is the need to ensure that information stored at a data center in a database be secured from tampering. For example, postage metering systems are now available whereby postage value in the form of an indicium can be obtained over the Internet. User accounts that are debited to pay for the downloaded postage are maintained in relational databases at a secure data center and are therefore secure from outsiders. However, there still exists the possibility that someone from within the data center could attempt to alter the postage account database records.

In relational databases, data is stored as a database record. To protect the record, the confidential portion of a database record is encrypted, the record is digitally signed, and the signature is attached to the record. When it is required that information in a particular database record be changed, the manipulation of the database record is only performed in a cryptographic device(s) which holds cryptographic keys for encryption and which digitally signs the manipulated database record. Database records in a relational database may, without adequate precautions being taken, be subject to "replay attacks" wherein an old but legitimate record is used to replace a newly updated record. Without a replay protection mechanism, a cryptographic device cannot detect such an attack.

United States Patent Application Publication U.S. 2002/0161742 (the "'742 application"), owned by the assignee of the present invention, the disclosure of which is incorporated herein by reference, describes systems and methods that provide for the secure management of database records and that protect against replay attacks by detecting such replay attacks as they occur. FIG. 1 shows a data center 1 including a customer database server 3 and a cryptographic device 5 according to one embodiment described in the '742 application. Customer database server 3 includes associated memory in which individual customer records 6 are stored. Each customer record 6 includes a customer identification 7, data 9, a freshness counter 11, and a digital signature 13. Digital signature 13 is created by cryptographic device 5 as discussed in more detail below.

Cryptographic device 5 is used to manipulate data 9 of customer records 6 upon the receipt of an authenticated command. Cryptographic device 5 includes a processor 15 for manipulating data 9 as well as for creating digital signature 13 using stored algorithms and keys 17. Cryptographic device 5 may also encrypt data 9 for additional record security purposes. Cryptographic device 5 also includes non-volatile memory (NVM) 18 in which freshness counters 21 are stored.

Each freshness counter 21 corresponds on a one to one basis with one of freshness counters 11 in customer records 6. Each freshness counter 11 and 21 is updated each time the associated individual customer record 6 is manipulated by cryptographic device 5. The freshness counters 11 and 21 used in one embodiment are simply incremental counters that go up by one for each record transaction performed by cryptographic device 5 (freshness counters 11 and 21 are initialized at some default value such as zero). However, the freshness counters 11 and 21 may be any other data that is unique to the individual transaction such as a randomly generated number or a time stamp.

When a customer record 6 has to be updated (because a transaction has occurred relative to that customer record 6), the customer record 6 is sent to and received by cryptographic device 5. Cryptographic device 5 checks the authenticity of the digital signature 13, and decrypts the contents of customer record 6 if encrypted. If the authentication of digital signature 13 (and any required decryption) is successful, then cryptographic device 5 compares freshness counter 11 obtained from customer record 6 against the corresponding freshness counter 21. If freshness counters 11 and 21 match, cryptographic device 5 updates the individual customer record 6 as requested and increments each of freshness counters 11 and 21. The updated customer record 6 is then signed by cryptographic device 5 and the updated customer record 6 with the new digital signature 13 appended thereto is stored at customer database server 3 as an updated customer record 6.

The above procedure solves the replay problem discussed above, because if an old customer record 6 is sent to cryptographic device 5 instead of a current updated customer record 6, the old customer record's digital signature 13 will be authenticated by the cryptographic device 5 but the freshness counter 21 and corresponding freshness counter 11 obtained from the old customer record 6 will not match, thereby providing evidence of a replay attack and allowing appropriate action to be taken by the proper authorities.

While the embodiment shown in FIG. 1 is effective and simple, its usefulness is limited by the size of non-volatile memory 18 of cryptographic device 5. As an example, suppose that one freshness counter 21 is 4 bytes long (the counter value ranges from 0 to 4294967295). To support a million records, the size of non-volatile memory 18 should be as large as 4 mega bytes, which exceeds the capacity of commercially available cryptographic devices. Additionally, for security purposes, freshness counter 21 should not overflow. If it reaches the maximum value, further transactions on such a record must be prohibited.

FIG. 2 shows another embodiment described in the '742 application which overcomes the limitation in the available size of the NVM in cryptographic devices. Data center 23 includes a database server 25 which has stored in associated memory individual customer records 6 as well as a freshness record database 27. Each column 29 (referred to as a freshness record 29) of the freshness record database 27 includes 200 individual freshness counters 11 and an associated total freshness counter 31 that represents the sum of all of the freshness counters 11 of the particular freshness record 29. Data center 23 also includes cryptographic device 35 having non-volatile memory 33. Non-volatile memory 33 stores total freshness counters 37 which correspond to and match total freshness counters 31 that are stored in freshness record database 27. Each freshness record 29 is digitally signed by cryptographic device 35 as discussed further below. The size of total freshness counters 31 and 37 of FIG. 2 should be much larger (preferably 200 times larger) than that of freshness counters 11. However, the size requirement of non-volatile memory 33 of cryptographic device 35 is effectively reduced to 200 times smaller than the non-volatile memory size requirement of the memory 18 of cryptographic device 5 of FIG. 1 since a counter for each customer record 6 is no longer stored in non-volatile memory 33 of cryptographic device 35.

In the FIG. 2 embodiment, the freshness of a customer record 6 is verified as follows. First, the customer database record 6 and the associated freshness record 29 from freshness record database 27 (e.g., customer record 6 for ID 1 and the freshness record 29 corresponding to ID 1) are provided to cryptographic device 35. Cryptographic device 35 then checks the digital signature of both the customer record 6 and the freshness record 29 to verify that they are authentic. Next, cryptographic device 35 compares the value in the total freshness counter 31 extracted from the freshness record 29 with the corresponding value in the total freshness counter 37 of its own non-volatile memory 33. If the values match, cryptographic device 35 extracts the freshness counter 11 from the freshness record 29 and compares the extracted freshness counter 11 against the freshness counter 11 of the customer database record 6. If they match, the freshness of the customer record 6 is verified.

Once the above verification has occurred, cryptographic device 35 performs the requested transaction and manipulates data 9 in the customer record 6 to reflect the transaction (for example, if data 9 represents postage meter accounts, the accounting records would be updated to reflect a transaction where postage was dispensed). Once the transaction is completed, cryptographic device 35 updates freshness counter 11 in the customer record 6, freshness counter 11 and total freshness counter 31 in corresponding freshness record 29, and the corresponding total freshness counter 37 in non-volatile memory 33. Cryptographic device 35 also appends a new cryptographic signature 13 to the customer record 6, cryptographically signs the freshness record 29, and sends the updated customer record 6 and freshness record 29 back to database server 25 for storage.

While the FIG. 2 embodiment uses only a single cryptographic device 35, large-scale systems may require the use of many cryptographic devices in order to support the ability to determine the freshness of a large number of customer records 6. FIG. 4 shows another embodiment described in the '742 application which includes a secure transaction system 41, which uses a plurality of cryptographic servers 36, 38, 40 (and associated cryptographic devices 42, 43, 44, 45, 46, and 47), database server 25, multiple transaction servers 49, and customer database 51 including all customer records 6 and freshness records 29. An example of a cryptographic device would be the cryptographic device from IBM model number 4758.

Transaction servers 49 execute a transaction request from a customer. The transaction servers 49 also serve as a communication relay from one cryptographic device to another cryptographic device. For each even numbered cryptographic device (42, 44, 46) there is a corresponding odd numbered cryptographic device (43, 45, 47). Each of the corresponding odd and even cryptographic devices hold an identical set of total freshness counters 37 for redundancy purposes. The arrangement of the cryptographic devices to their corresponding cryptographic server is such that even if one cryptographic server is out of service, the transaction system 41 still functions. In the embodiment shown in FIG. 4, there is no single point of failure because: (1) there are multiple transaction servers 49, (2) a pair of cryptographic devices share identical total freshness counters 37, and (3) each of the cryptographic devices of a pair of corresponding cryptographic devices is housed in a different cryptographic server. Each of the cryptographic devices 42, 43, 44, 45, 46, and 47 has at least the same functionality as cryptographic device 35 shown in FIG. 2.

The processing of a transaction by secure transaction system 41 makes use of the multi-threading capability of the cryptographic devices, i.e. the capability to process a transaction as well as to verify the freshness of the customer record 6. Thus, in the embodiment shown in FIG. 4, transaction servers 49 can request that a transaction occur at any one of the cryptographic devices 42, 43, 44, 45, 46, 47.

FIG. 3 shows the record structure for a customer record 6 as well as for freshness records 29 that are stored in customer database 51 of FIG. 4 in order to permit the operation of system 41. Each customer record 6 has all the data required to locate the individual freshness counters 11 in the corresponding freshness record 29, i.e., the cryptographic device ID 53, the freshness record ID 55, and the offset 57 of the freshness record 29. Freshness record 29 consists of the cryptographic device ID 53, the freshness record ID 55, individual freshness counters 11, and the total freshness counter 31. In system 41, a particular cryptographic device holds the total freshness counters 37 for a predefined set of customer records 6. Customer records 6 in customer database 51 are used to perform transactions. Examples of such transactions are those that are conducted in an Internet postage system. The postal funds in a customer record 6 can be deducted when the proof of postage is delivered to a customer. Performance of the accounting transaction on the data 9 of the customer record 6 can be executed in any one of the cryptographic devices shown in FIG. 4, while the verification of the freshness of the customer record 6 can be delegated to a different one of the cryptographic devices in the network of cryptographic devices shown in FIG. 4 that has the corresponding total freshness counter 37 stored therein. Further, an individual cryptographic device also may fail. Accordingly, for reliability and backup, total freshness counters 37 are stored on two different cryptographic devices.

The operation of system 41 is as follows. First, a transaction server 49 receives a customer record 6 from the customer record database 51 via the database server 25, and sends it to any available cryptographic device (42, 43, 44, 45, 46, 47), referred to as the chosen cryptographic device. The chosen cryptographic device then verifies the digital signature 13 of the customer record 6, and extracts the cryptographic ID 53, freshness record ID 55, freshness counter 11 and offset 57 therefrom. The chosen cryptographic device then issues a request (which includes the extracted data) to verify the freshness of the customer record 6 to the transaction server 49. The transaction server 49 gets the freshness record 29 identified in the customer record 6 by the freshness record ID 55 from database server 25. Both the freshness record 29 and the request from the chosen cryptographic device are sent by the transaction server 49 to the cryptographic device identified by the cryptographic ID 53 as well as the matching redundant back-up cryptographic device. Both of the identified matching cryptographic devices independently verify the freshness of the customer record 6 in accordance with the procedure discussed above in connection with FIG. 2. The two matching cryptographic devices (one even, one odd) update the freshness record 29 and the total freshness counter 37 and provide the updated freshness record 29 to the transaction server 49 together with a freshness verification message. If either verification fails, the transaction will not be authorized and system 41 can be alerted to the discrepancy. Assuming a successful verification has occurred, the transaction server 49 delivers the verification message to the chosen cryptographic device. If verification has occurred, the chosen cryptographic device updates the data 9 of the customer record 6 to reflect the performed transaction, updates freshness counter 11 in the customer record 6, attaches a new digital signature 13 and sends the updated customer record 6 to the transaction server 49. The transaction server 49 updates both the customer record 6 and the freshness record 29 in database 51 via database server 25.

While system 41 shown in FIG. 4 has been found to be very effective for determining the freshness of a large number of customer records 6 in a large-scale system, it utilizes multiple redundant cryptographic devices and therefore carries with it the extra expense that is associated therewith. Thus, a system for effectively determining the freshness of a large number of customer records 6 in a large-scale system that reduces the number of cryptographic devices that are utilized while at the same time managing and recovering from device failure would be beneficial.

SUMMARY OF THE INVENTION

The present invention relates to a method of managing and recovering from the failure of a cryptographic device in a secure transaction system including a database, a plurality of first cryptographic devices, and a standby cryptographic device, wherein the database stores a plurality of customer records and each first cryptographic device stores a plurality of total freshness counters used to verify the freshness of one or more of the customer records. The method comprises causing each of the first cryptographic devices to periodically: (i) generate a total freshness counter record including the total freshness counters stored by the first cryptographic device, a digital signature based on the total freshness counters included in the total freshness counter record, and a freshness counter for the total freshness counter record, (ii) send the generated total freshness counter record to the database for storage therein, (iii) generate a digital signature and time stamp record including the freshness counter that was included in the total freshness counter record generated by the first cryptographic device and a time stamp indicating the time that the digital signature and time stamp record was generated, and (iv) send the generated digital signature and time stamp record to at least one other of the first cryptographic devices for storage thereby. Upon failure of one of the first cryptographic devices, the method further includes: (a) sending the total freshness counter record most recently stored in the database by the failed first cryptographic device from the database to the standby cryptographic device and sending the digital signature and time stamp record most recently sent by the failed first cryptographic device to the at least one other of the first cryptographic devices for storage thereby from the at least one other of the first cryptographic devices to the standby cryptographic device, (b) causing the standby cryptographic device to verify the authenticity of the received total freshness counter record using the digital signature included therein and to check that the received total freshness counter record is most current by comparing the freshness counter included therein to the freshness counter associated with the failed cryptographic device included in the received digital signature and time stamp record, and, (c) if the authenticity is verified and if the received total freshness counter record is determined to be most current, causing the standby cryptographic device to assume the place and responsibility of the failed first cryptographic device in the secure transaction processing system.

Preferably, each of the customer records includes a first customer freshness counter, and the database also stores a plurality of freshness records, wherein each of the freshness records includes a plurality of second customer freshness counters that correspond to a selected group of the first customer freshness counters and a second total freshness counter for the freshness record. Preferably, the total freshness counters of each of the first cryptographic devices correspond to a selected group of the second total freshness counters from a selected group of the freshness records. In addition, in the preferred embodiment, when the standby cryptographic device assumes the place and responsibility of the failed first cryptographic device, it uses the total freshness counters included in the received total freshness counter to verify the freshness of one or more of the customer records.

In one embodiment, the secure transaction system may be utilized to dispense postage and each of the first cryptographic devices may be used to facilitate the dispensing of postage. In this embodiment, steps (i), (ii), (iii), and (iv) of the method may be performed when each of the first cryptographic devices facilities the dispensing of a fixed amount of postage.

In one particular embodiment, each of the first cryptographic devices is included in a separate cryptographic server. In another particular embodiment, two or more of the first cryptographic devices are included in a single cryptographic server. In yet another particular embodiment, the generated digital signature and time stamp records are sent to only one other cryptographic device. In an alternate particular embodiment, the generated digital signature and time stamp records are sent to two or more other cryptographic devices. Preferably, in any of the described embodiments, the digital signature and time stamp records periodically generated by each of the first cryptographic devices further include digital signatures and time stamps associated with the other cryptographic devices in the system.

Therefore, it should now be apparent that the invention substantially achieves all of the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE INVENTION

Figure 4:
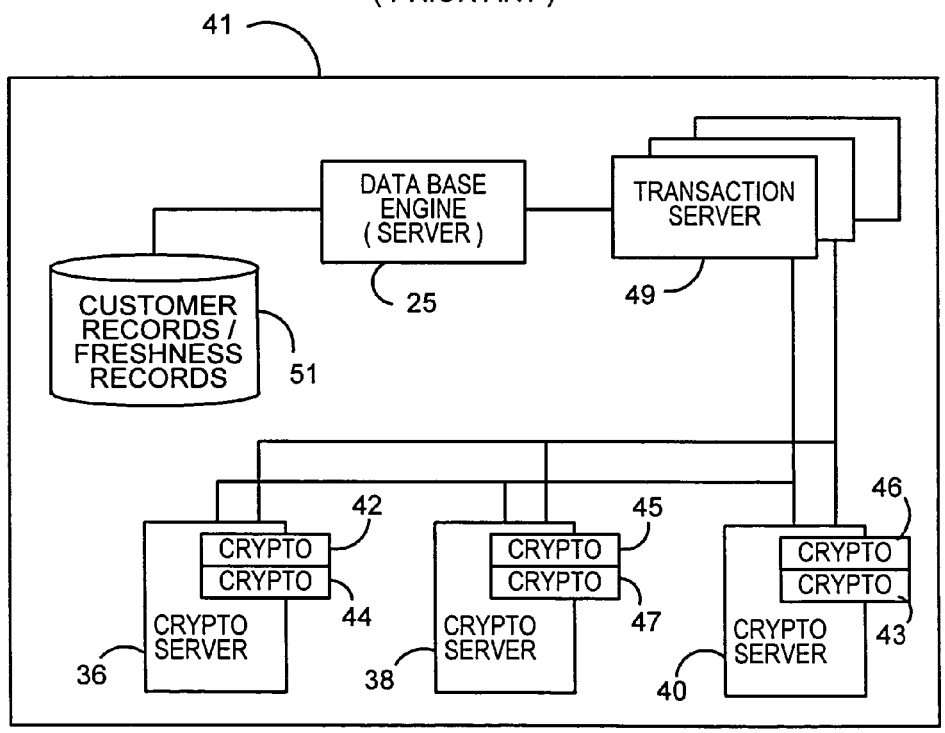
FIG. 4 shows a large-scale implementation of a prior art system for preventing a replay attack including multiple cryptographic devices and having freshness redundancy capability.
Figure 5:
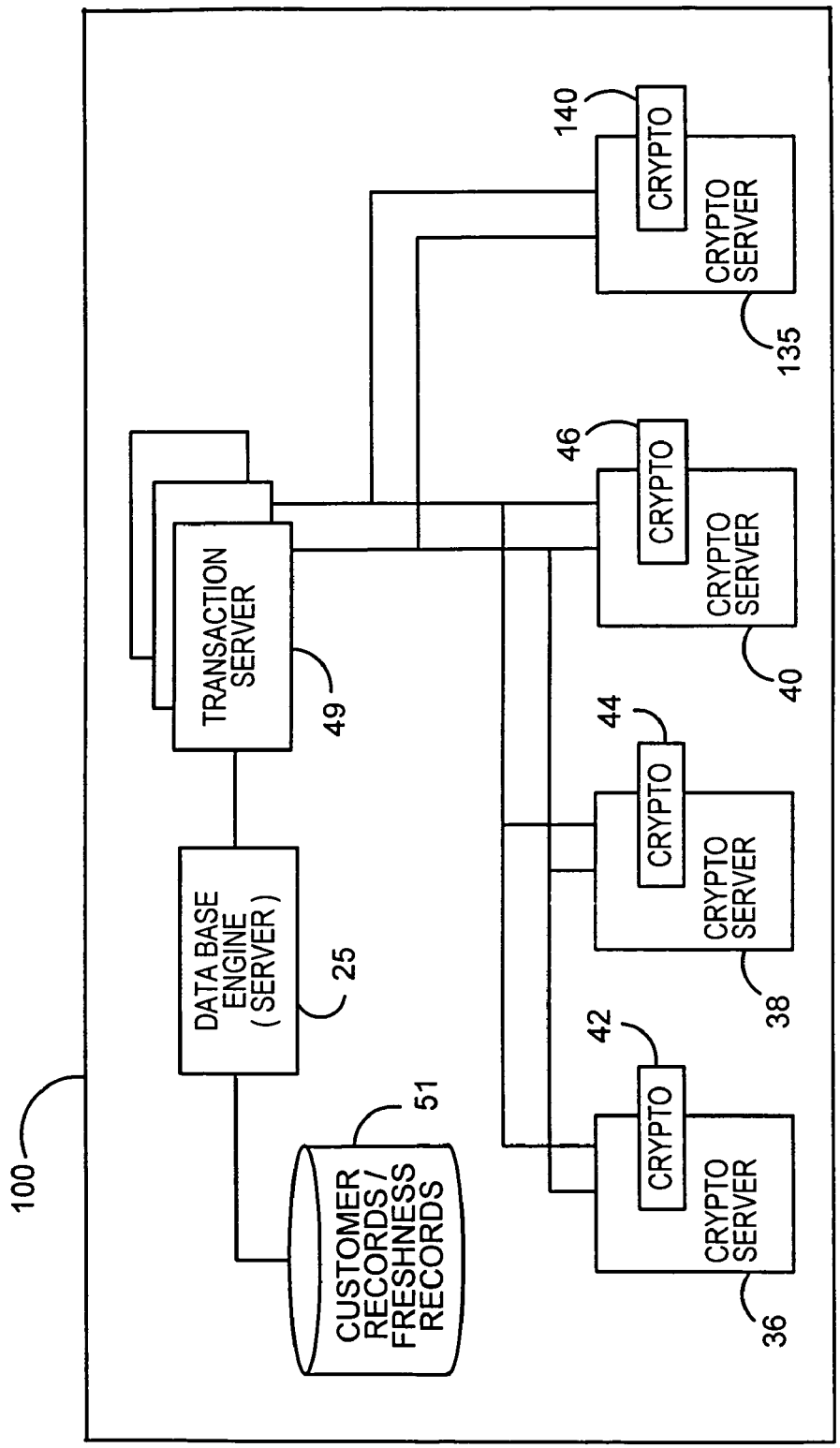
FIG. 5 is a block diagram of a system for preventing a replay attack including multiple cryptographic devices and having failure management and recovery capability according to an embodiment of the present invention.

FIG. 5 is a block diagram of secure transaction system 100 according to a preferred embodiment of the present invention. Like secure transaction system 41 shown in FIG. 4, secure transaction system 100 includes customer database 51 that stores a plurality of customer records 6 and freshness records 29 as described above, database server 25, and multiple transaction servers 49. In addition, like secure transaction system 41, secure transaction system 100 also includes a plurality of cryptographic servers 36, 38, and 40. However, secure transaction system 100 differs from secure transaction system 41 in the provision, arrangement and utilization of the cryptographic devices. Specifically, as described above, in secure transaction system 41, each cryptographic server 36, 38 and 40 includes two cryptographic devices (42 and 44 in the case of cryptographic server 36, 45 and 47 in the case of cryptographic server 38, and 43 and 46 in the case of cryptographic server 40), wherein for each even numbered cryptographic device (42, 44 and 46), there is a corresponding odd numbered cryptographic device (43, 45 and 47). Each of the corresponding even and odd cryptographic devices store an identical set of total freshness counters 37 for redundancy purposes, such that if one cryptographic server (36, 38 or 40) or device (42, 43, 44, 45, 46 or 47) is out of service, secure transaction system 41 still functions. In contrast, in secure transaction system 100, there is no duplication of total freshness counters 37 in a second redundant cryptographic device. Instead, each cryptographic server 36, 38, 40 includes only one cryptographic device (42, 44 or 46), wherein each cryptographic device 42, 44, 46 holds the total freshness records 37 for a different group of customers. Secure transaction system 100 is able to continue functioning in the event of the failure of one of the cryptographic devices 42, 44 or 46 (meaning either the cryptographic device itself fails, the cryptographic server housing it fails, or both) in the manner described below through use of standby cryptographic server 135 and standby cryptographic device 140 shown in FIG. 5, total freshness counter records 115 shown in FIG. 6 and digital signature and time stamp records 120 shown in FIG. 7, and is able to do so without two times as many cryptographic devices for complete redundancy.

In an alternate embodiment, each of cryptographic devices 42, 44 and 46 may be housed in a single cryptographic server such as cryptographic server 36. While eliminating hardware and thus costs, this embodiment is not as robust as the FIG. 5 embodiment because failure of the single cryptographic server will result in failure of all of the cryptographic devices 42, 44, 46. In another embodiment, two or more cryptographic servers may house multiple cryptographic devices, none of which are duplicative for redundancy purposes.

Figure 6:
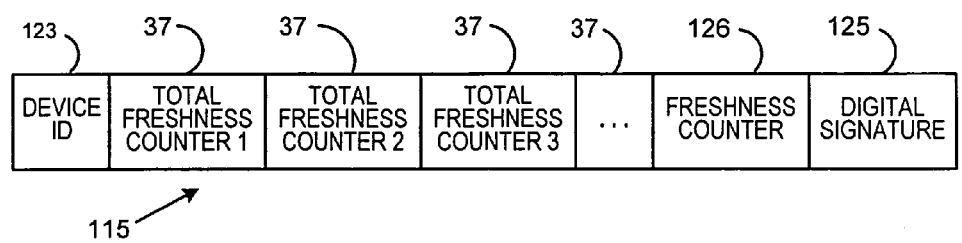
FIG. 6 is a diagram showing the structure of total freshness counter records used in the system shown in FIG. 5.

FIG. 6 is a diagram showing the structure and content of a total freshness counter record 115 according to an aspect of the present invention. Each total freshness counter record 115 corresponds to and is associated with one of the cryptographic devices 42, 44, 46 and thus a particular group of selected customers whose customer records 6 are stored in database 51. As seen in FIG. 6, each total freshness counter record 115 includes a device ID identifying the device to which the total freshness counter record 115 corresponds, and the total freshness counters 37 that correspond to each of the freshness records 29 (and thus a selected group of customers) for which the cryptographic device (42, 44 or 46) in question is responsible. In addition, each total freshness counter record 115 includes a digital signature 125 of the contents of the total freshness counter record 115 and a freshness counter 126 that gets incremented each time the total freshness counter record 115 is updated as described below.

Figure 7:
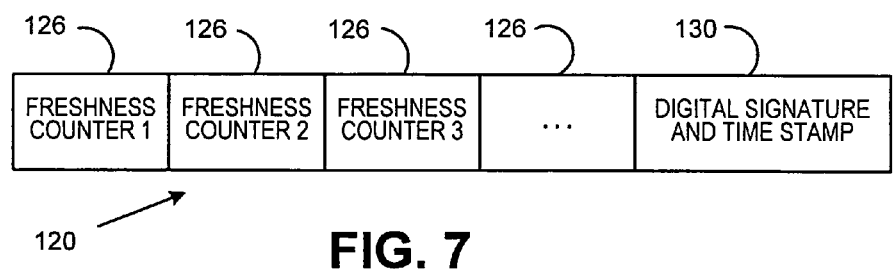
FIG. 7 is a diagram showing the structure of digital signature and time stamp records used in the system shown in FIG. 5.

FIG. 7 is a diagram showing the structure and content of a digital signature and time stamp record 120 according to a further aspect of the present invention. Each digital signature and time stamp record 120 includes the freshness counter 126 associated with each of the cryptographic devices (42, 44, 46 or possibly more) forming part of secure transaction system 100 (for example, freshness counter 1 may correspond to cryptographic device 42, freshness counter 2 may correspond to cryptographic device 44, and freshness counter 3 may correspond to cryptographic device 46). Each digital signature and time stamp record 120 further includes a digital signature and time stamp 130, which is a digital signature of the contents thereof and a time stamp indicating the time (and preferably date) of generation of the digital signature and time stamp record 120. The digital signature and time stamp can be utilized to ensure authenticity of the record 120, and to ensure the timeliness of the record 120.

Figure 1:
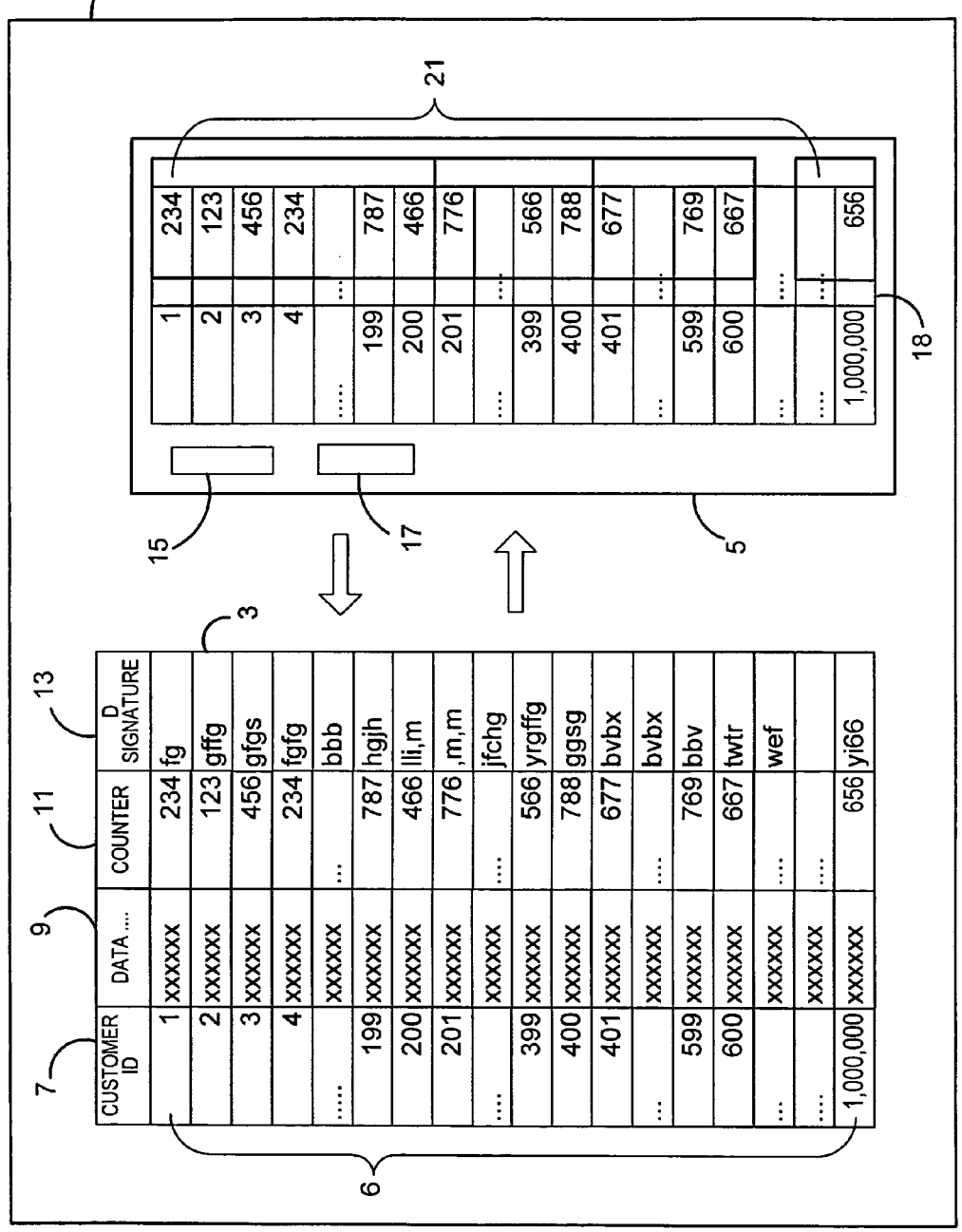
FIG. 1 is a block diagram of a first prior art system for preventing a replay attack.
Figure 2:
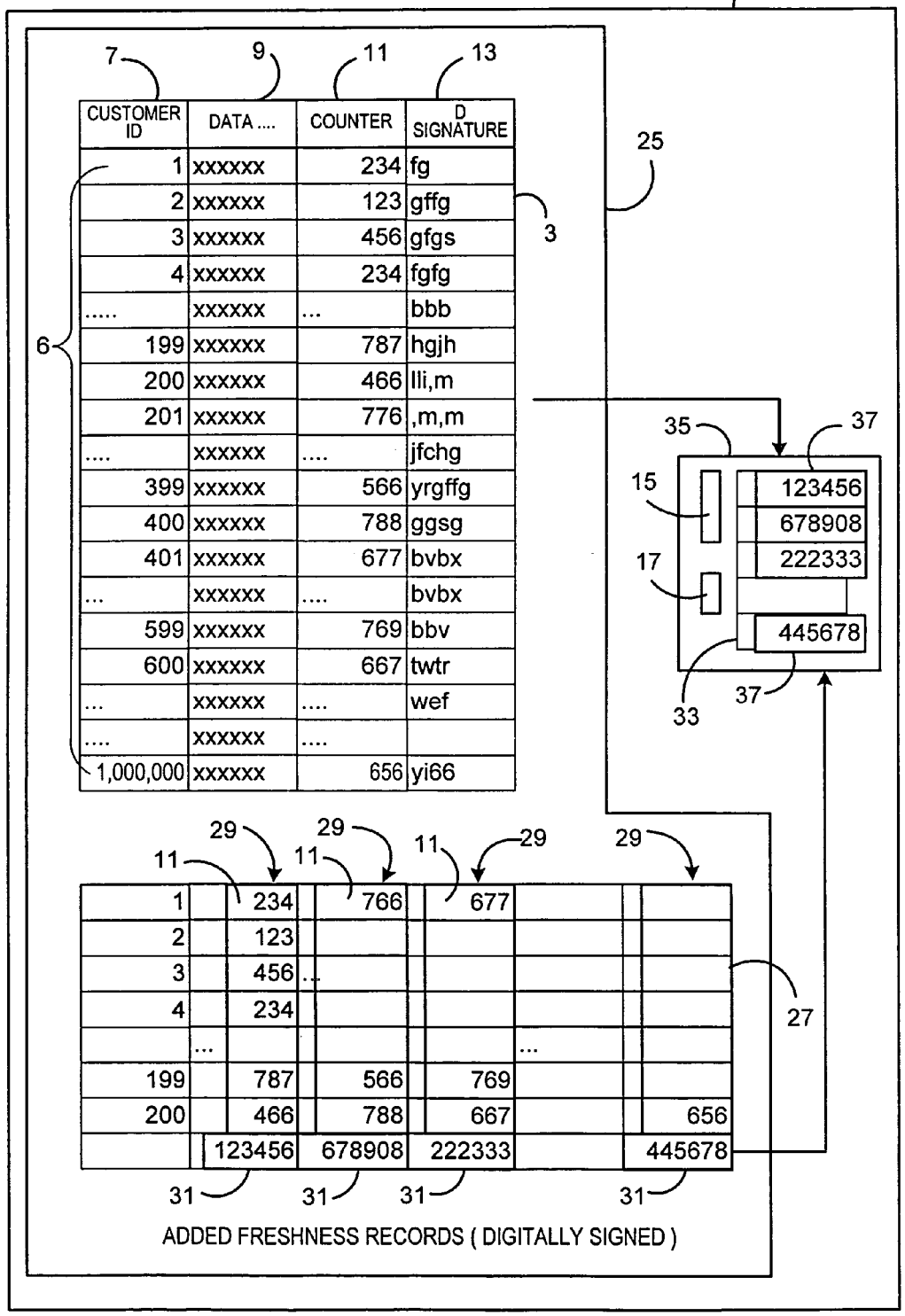
FIG. 2 is a block diagram of a second prior art system for preventing a replay attack.
Figure 3:
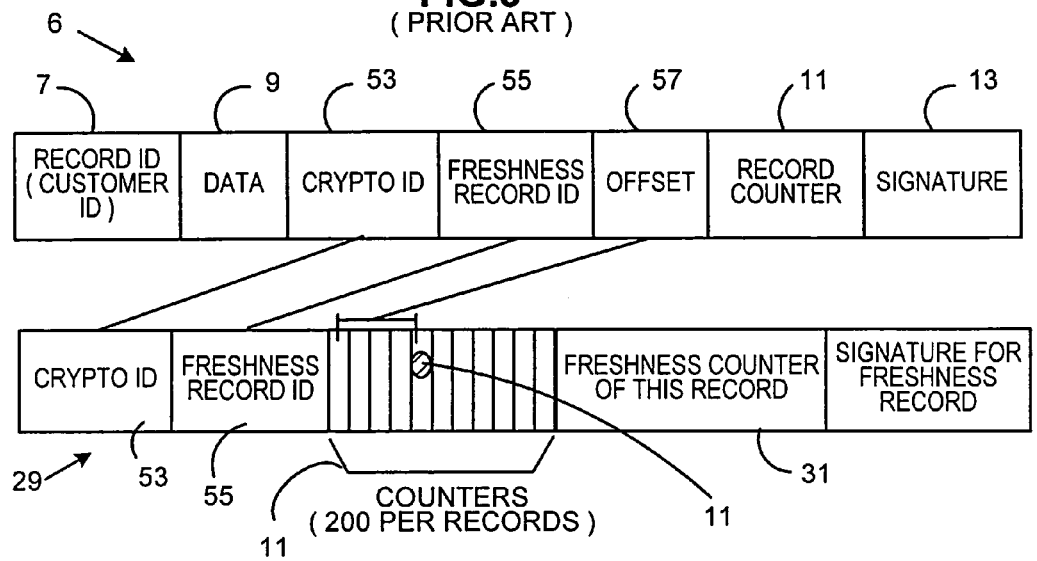
FIG. 3 is a diagram showing the structure of customer and freshness records used in the system shown in FIG. 4.

In operation, secure transaction system 100 processes transactions, such as the dispensing and refilling of postage, and checks the integrity and freshness of the various records (customer records 6 and freshness records 29) in the same manner as described above in connection with FIG. 4 (except that no redundant cryptographic devices (43, 45 and 47) are used). In particular, a transaction server 49 first receives a customer record 6 from the customer record database 51 via the database server 25, and sends it to any available cryptographic device (42, 44, 46), referred to as the chosen cryptographic device. The chosen cryptographic device then verifies the digital signature 13 of the customer record 6, and extracts the cryptographic ID 53, freshness record ID 55, freshness counter 11 and offset 57 therefrom. The chosen cryptographic device then issues a request (which includes the extracted data) to verify the freshness of the customer record 6 to the transaction server 49. The transaction server 49 gets the freshness record 29 identified in the customer record 6 by the freshness record ID 55 from database server 25. Both the freshness record 29 and the request from the chosen cryptographic device are sent by the transaction server 49 to the cryptographic device identified by the cryptographic ID 53. The cryptographic device identified by the cryptographic ID 53 independently verifies the freshness of the customer record 6 in accordance with the procedure discussed above in connection with FIG. 2. The cryptographic device updates the freshness record 29 and the total freshness counter 37 and provides the updated freshness record 29 to the transaction server 49 together with a freshness verification message. If either verification fails, the transaction will not be authorized and system 100 can be alerted to the discrepancy. Assuming a successful verification has occurred, the transaction server 49 delivers the verification message to the chosen cryptographic device. If verification has occurred, the chosen cryptographic device updates the data 9 of the customer record 6 to reflect the performed transaction, updates freshness counter 11 in the customer record 6, attaches a new digital signature 13 and sends the updated customer record 6 to the transaction server 49. The transaction server 49 updates both the customer record 6 and the freshness record 29 in database 51 via database server 25.

In addition, each cryptographic device 42, 44, 46 periodically generates (either newly or by updating an existing record) a total freshness counter record 115 that includes the then current total freshness counters 37 for each of the freshness records 29 for which the cryptographic device in question is responsible, a digital signature 125 that reflects the digital signature of the record contents, and a freshness counter 126 that reflects a count of the number of times the total freshness counter record 115 has been updated. Such total freshness counter records 115 may be periodically generated based upon the passing of a particular time period, such as once a day or once every twelve hours, or upon the occurrence of a certain number or type of transactions, such as the dispensing of a predetermined amount of postage (e.g., $3,000 in postage) by the cryptographic device in question. Each total freshness counter record 115, when so generated, is transmitted to customer record database 51 for storage. In addition, on the same periodic basis, each cryptographic device 42, 44, 46 also generates (either newly or by updating an existing record) a digital signature and time stamp record 120 in the form shown in FIG. 7 and transmits that digital signature and time stamp record 120 to at least one other of the cryptographic devices forming a part of secure transaction system 100 for storage thereby. Preferably, each cryptographic device 42, 44, 46 transmits the digital signature and time stamp record 120 that it generates to its next nearest neighbor cryptographic device (e.g., cryptographic device 42 transmits to cryptographic device 44, cryptographic device 44 transmits to cryptographic device 46, and cryptographic device 46 transmits to cryptographic device 42). As will be appreciated, when such digital signature and time stamp records 120 are initially created by each cryptographic device 42, 44, 46, they will only include the current freshness counter 126 for the particular cryptographic device in question, and the record fields for the other cryptographic devices will be set to some default value. However, over time, as each cryptographic device 42, 44, 46 receives the digital signature and time stamp record 120 from another cryptographic device, preferably its next nearest neighbor, it will extract from that digital signature and time stamp record 120 the appropriate freshness counters 126 for the other cryptographic devices in the system and will include those freshness counters 126 in the digital signature and time stamp record 120 it creates before subsequently transmitting it as described herein. Thus, after a period of time elapses in which such digital signature and time stamp records 120 are generated and transmitted by each cryptographic device 42, 44, 46, each cryptographic device 42, 44, 46 will have the ability to attest to some level of freshness integrity for any other cryptographic device forming a part of secure transaction system 100.

According to an aspect of the present invention, in the event that one of cryptographic devices 42, 44, or 46 fails, standby cryptographic device 140 shown in FIG. 5, preferably housed on standby cryptographic server 135, will take over for and assume the personality and responsibilities of the failed cryptographic device. To do so, standby cryptographic device 140 first requests that it be sent, through a transaction server 49 and through database server 25, the total freshness counter record 115 for the failed cryptographic device that is stored in customer record database 51. In addition, standby cryptographic device 140 requests that it be sent the digital signature and time stamp record 120 from the cryptographic device 42, 44, or 46 that received the digital signature and time stamp record 120 from the failed cryptographic device for storage, which in the preferred embodiment would be the next nearest neighbor cryptographic device of the failed cryptographic device. Standby cryptographic device 140, upon receiving these records, checks the authenticity of the total freshness counter record 115 received from customer record database 51 by verifying the record's digital signature 125. Standby cryptographic device 140 also verifies that the total freshness counter record 115 received from customer record database 51 is up-to-date (meaning it was the record most recently sent for storage) by comparing the freshness counter 126 included in the total freshness counter record 115 to the freshness counter 126 extracted from the received digital signature and time stamp record 120 (i.e., that corresponds to the failed cryptographic device). If the two freshness counters 126 match, indicating that the total freshness counter record 115 is the most current, then standby cryptographic device 140 begins the role and assumes the responsibilities, i.e., operation, of the failed cryptographic device, using the data provided in total freshness counter record 115 received from customer record database 51 in the transaction processing and integrity and freshness record verification steps described above. In addition, for increased failure protection, multiple standby cryptographic servers and/or standby cryptographic devices may be provided in secure transaction system 100 and may be utilized to replace a failed cryptographic device as needed as described herein. If the two freshness counters 126 do not match, indicating that the records may have been tampered with, replaced by stale records, or failed to be previously updated, standby cryptographic device 140 can be prevented from assuming the operation of the failed cryptographic device, and the system 100 can provide an alert to the discrepancy to allow appropriate follow-up action to determine the cause of and fix the discrepancy.

Thus, according to the present invention, in the event of a failure wherein standby cryptographic device 140 takes on the role of a failed cryptographic device, a finite amount of loss will be able to be identified, which finite amount depends upon the nature of the periodic interval in which total freshness counter records 115 and digital signature and time stamp records 120 are generated and stored as described herein. For example, if such records are generated and stored every time a cryptographic device dispenses $3,000 worth of postage, it will be known that no more than $3,000 worth of postage will have been lost and/or unaccounted for in the event of a failure because the total freshness counter record 115 that is verified by standby cryptographic device 140 will have been created no more than $3,000 worth of postage ago. Standby cryptographic device 140 will then pick up from that point (i.e., where the total freshness counter record 115 left off), and a maximum amount of potential loss, defined by the periodic basis of the generation and storage of total freshness counter records 115 and digital signature and time stamp records 120, may be reported to appropriate authorities.

According to an alternate embodiment of the present invention, rather than having each cryptographic device 42, 44, 46 transmit its generated digital signature and time stamp record 120 to only one other cryptographic device, each cryptographic device 42, 44, 46 may transmit such generated digital signature and time stamp records 120 to multiple cryptographic devices in the system, such as, for example, every other cryptographic device in secure transaction system 100. Thus, in this embodiment, in the event of a failure, standby cryptographic device 140 would have the ability to obtain the appropriate digital signature and time stamp record 120 from more than one other cryptographic device in secure transaction system 100, thereby providing added protection in the event of the failure of multiple cryptographic devices.

Thus, secure transaction system 100 as described herein is able to provide record integrity and freshness verification along with back-up functionality for managing and recovering from failure situations without the need to have two times the number of cryptographic devices for complete redundant back-up.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a secure transaction processing system including a database, a plurality of first cryptographic devices, and a standby cryptographic device, wherein said database stores a plurality of customer records and each first cryptographic device stores a plurality of total freshness counters used to verify the freshness of one or more of the customer records, a method of managing and recovering from a failure of one of said first cryptographic devices, said method comprising:

causing each of said first cryptographic devices to periodically: (i) generate a total freshness counter record including the total freshness counters stored therein, a digital signature based on the total freshness counters included in the total freshness counter record, and a freshness counter indicating a number of times that the total freshness counter record was updated, (ii) send the generated total freshness counter record to said database for storage therein, (iii) generate a digital signature and time stamp record including the freshness counter that was included in the generated total freshness counter record, and (iv) send the generated digital signature and time stamp record to at least one other of said first cryptographic devices for storage;

upon failure of one of said first cryptographic devices, sending the total freshness counter record most recently stored in said database from the failed first cryptographic device from said database to said standby cryptographic device and sending the digital signature and time stamp record most recently sent by the failed first cryptographic device to said at least one other of said first cryptographic devices for storage from said at least one other of said first cryptographic devices to said standby cryptographic device;

verifying, by said standby cryptographic device, the authenticity of the received total freshness counter record using the digital signature included therein and checking that the received total freshness counter record is most current by comparing the freshness counter included therein to the freshness counter associated with the failed cryptographic device included in the received digital signature and time stamp record; and if said authenticity is verified and if the received total freshness counter record is determined to be most current, causing said standby cryptographic device to assume operation of the failed first cryptographic device in said secure transaction processing system.

2. A method according to claim 1, each said customer record including a first customer freshness counter, said database also storing a plurality of freshness records, each said freshness record including a plurality of second customer freshness counters that correspond to a selected group of said first customer freshness counters and a second total freshness counter for said freshness record, said total freshness counters stored by each of said first cryptographic devices corresponding to a selected group of said second total freshness counters from a selected group of said freshness records.

3. A method according to claim 1, wherein when said standby cryptographic device assumes operation of the failed first cryptographic device, said standby cryptographic device uses the total freshness counters included in the received total freshness counter record to verify the freshness of one or more of the customer records.

4. A method according to claim 1, said first cryptographic devices being used to facilitate the dispensing of postage, wherein said step of causing each of said first cryptographic devices to periodically perform steps (i), (ii), (iii) and (iv) is performed when each of said first cryptographic devices facilitates the dispensing of a fixed amount of postage.

5. A method according to claim 1, each of said first cryptographic devices being included in a separate cryptographic server.

6. A method according to claim 1, two or more of said first cryptographic devices being included in a single cryptographic server.

7. A method according to claim 1, wherein the at least one other of said first cryptographic devices is a single one of said first cryptographic devices.

8. A method according to claim 1, wherein the at least one other of said first cryptographic devices is two or more of said first cryptographic devices.

9. A method according to claim 1, wherein the digital signature and time stamp records periodically generated by each of said first cryptographic devices further include digital signatures and time stamps associated with the other first cryptographic devices.

10. A secure transaction processing system comprising:

a database, the database storing a plurality of customer records;

a plurality of first cryptographic devices, each first cryptographic device storing a plurality of total freshness counters used to verify the freshness of one or more of the customer records;

a standby cryptographic device, means for causing each of said first cryptographic devices to periodically: (i) generate a total freshness counter record including the total freshness counters stored therein, a digital signature based on the total freshness counters included in the total freshness counter record, and a freshness counter indicating a number of times that the total freshness counter record was updated, (ii) send the generated total freshness counter record to said database for storage therein, (iii) generate a digital signature and time stamp record including the freshness counter that was included in the generated total freshness counter record, and (iv) send the generated digital signature and time stamp record to at least one other of said first cryptographic devices for storage;

means for, upon failure of one of said first cryptographic devices, sending the total freshness counter record most recently stored in said database from the failed first cryptographic device from said database to said standby cryptographic device and sending the digital signature and time stamp record most recently sent by the failed first cryptographic device to said at least one other of said first cryptographic devices for storage from said at least one other of said first cryptographic devices to said standby cryptographic device; and means for verifying, by said standby cryptographic device, the authenticity of the received total freshness counter record using the digital signature included therein and checking that the received total freshness counter record is most current by comparing the freshness counter included therein to the freshness counter associated with the failed cryptographic device included in the received digital signature and time stamp record;

wherein said standby cryptographic device will assume operation of the failed first cryptographic device in said secure transaction processing system if said authenticity is verified and if the received total freshness counter record is determined to be most current.

11. The system according to claim 10, wherein each said customer record includes a first customer freshness counter and said database stores a plurality of freshness records, each said freshness record including a plurality of second customer freshness counters that correspond to a selected group of said first customer freshness counters and a second total freshness counter for said freshness record, said total freshness counters stored by each of said first cryptographic devices corresponding to a selected group of said second total freshness counters from a selected group of said freshness records.

12. The system according to claim 10, wherein when said standby cryptographic device assumes operation of the failed first cryptographic device, said standby cryptographic device uses the total freshness counters included in the received total freshness counter record to verify the freshness of one or more of the customer records.

13. The system according to claim 10, wherein said first cryptographic devices are used to facilitate the dispensing of postage.

14. The system according to claim 10, further comprising:
a plurality of cryptographic servers, wherein each of said first cryptographic devices is included in a separate cryptographic server.

15. The system according to claim 10, further comprising:
a cryptographic server, wherein two or more of said first cryptographic devices being included in said cryptographic server.

16. The system according to claim 10, wherein the at least one other of said first cryptographic devices is a single one of said first cryptographic devices.

17. The system according to claim 10, wherein the at least one other of said first cryptographic devices is two or more of said first cryptographic devices.

18. The system according to claim 10, wherein the digital signature and time stamp records periodically generated by each of said first cryptographic devices further include digital signatures and time stamps associated with the other first cryptographic devices.

* * * * *